United States Patent [19]

Buchfuhrer et al.

[11] 3,708,100
[45] Jan. 2, 1973

[54] SYSTEM AND MACHINERY FOR CONSTRUCTION OF SHIP SECTIONS

[75] Inventors: Gerhard Buchfuhrer; Alfred Dudszus; Wilhelm Milles; Franz Lerche; Gunter Feyer; Manfred Krause; Josef Grunwald; Ulrich Hensel; Ingo Aust; Gunter Ewald; Walter Langer; Gunther Ludke; Karl-Georg Mohle; Joachim Oberlander; Horst Kowalski; Eckard Gatzke; Gerd Pernaux; Otto Schwank; Konrad Leschnewski; Reinhard Brose; Gunter Hartwig; Ulrich Ploetz, all of Rostock, Germany

[73] Assignee: Veb Ingenieurburo Schiffbau, Rostock-Osthafen, Germany

[22] Filed: Nov. 5, 1970

[21] Appl. No.: 87,221

[52] U.S. Cl. ............228/47, 29/155, 29/200 P, 29/475, 114/65, 228/4, 228/6
[51] Int. Cl. ............................................B23k 37/04
[58] Field of Search..........29/200 P, 200 J, 475, 155; 228/6, 25, 4, 44, 45, 47; 219/124, 125, 130; 114/65

[56] References Cited

UNITED STATES PATENTS 3,561,663   2/1971   Wenylaff..............................228/25
3,576,421   5/1971   Fiegel, Jr..............................219/130
3,529,346   9/1970   Grimoldi et al. ......................29/475
2,142,109   1/1939   Burke...................................113/112

Primary Examiner—John F. Campbell
Assistant Examiner—R. J. Craig
Attorney—Nolte & Nolte

[57]   ABSTRACT

A system for construction of ship sections. Mechanized devices are provided for assembling two-dimensional and three-dimensional sections from individual parts, under control of automatic and easily computerized mechanisms for forming, positioning and welding the sections. Sequences or systems of such devices and control mechanisms, for making flat or three-dimensional sections, are largely disposed in parallel, and the materials are conveyed in uniform directions along the parallel lines. Intermediate storage facilities are provided for compensation of slack in any of the parallel systems. Also provided is an ultimate receiving and finishing section, for work on elements from the preceding sections. Ship plates move along the several lines on trolleys equipped with suitable holders, and are processed by multiplicities of steel plate processing machines, basically known by themselves but specially arranged to suit the new system.

17 Claims, 6 Drawing Figures

SYSTEM AND MACHINERY FOR CONSTRUCTION OF SHIP SECTIONS

BACKGROUND AND NATURE OF THE INVENTION

In the assembly of ship hulls, made from prefabricated sections, there has been a desire to provide more highly mechanized systems for cyclic and continuous construction. While other industries, for example the production of cars, are largely or perfectly mechanized and automated with regard to their assembly operations, the construction of ships thus far provided only beginnings of mechanization and automating.

The ship sections are, usually, produced in intermittent and cyclic systems, which are mechanized only in part. For this reason a large number of processing and assembling areas are commonly used, the total area required is large, and the producing and transporting facilities are expensive. This is one of the reasons for the desire to provide more highly mechanized and automated units. Beginnings toward development in this direction may be seen in mechanized assembly-conveyors for flat sections, which are now operating, and in highly mechanized conveyor units for curved skin sections, proposed in the literature. However, each of these arrangements, being of a cyclic, intermittent type, needs relatively large room, and has the drawback that the consecutive butt welding and fillet welding machines, operating in such a system, are lacking in centralized control.

It has also been proposed to concentrate the construction of ship's hull sections in specialized assembly plants, and in such a plant to provide assembly conveyors for flat and curved plate units or plate sections. In this case the shipyard itself would only perform the final assembly operation. Such proposals suggest the concept of developing ship-building into a developed assembly operation. However, the proposals are less than perfect with respect to the principles thus far proposed for assembly of sections and the conveyor routes.

Heretofore, in order to minimize the time needed for construction and to perform the work in favorably located areas, particularly for the production of large three-dimensional sections, such as F sections, double bottoms and the like, beginnings have been made with the help of high-power cranes whereby the large sections are transported to the ship and mounted thereon. If assembly halls or plants, with conveyors for production of flat or shaped skin sections, were provided in such a system, the result would be that highly mechanized production of simple sections would be combined with the usual, un-integrated assembly methods for large three-dimensional sections. This would leave the possibilities of full mechanization and automating unused in the most decisive state, and would accordingly not utilize the possibilities of electronically computerized assembly work.

The conveyor systems used up to now have drawbacks of their own. They usually are arranged for cyclically, intermittently operating conveyors. These are wasteful of space, particularly when such conveyors are also used for complex, three-dimensional sections.

The invention provides a new system for construction of ship elements, and groups of elements, with highly mechanized and automated control and conveyoring. It is the object of the invention to perform the entire assembly of ship hull sections in a highly mechanized and integrated assembly system. This increases the economy of constructive work in the assembly of sections and improves all results of the productive process, from production of elements to assembly of sections.

For these purposes, the invention provides a system of assembly machines for mounting and combining elements of ship structure, based on suitable subdivision of the ship's hull, and o the use of highly mechanized and automated methods, with suitable inter-relationship between the several machines and with limited need for space. The new system uses one area for the production of flat sections and another for the production of three-dimensional sections, such as F sections or double bottoms, the two areas being inter-related so that the second uses some of the products of the first. The use of the second assembly stage adds to the accuracy of production of sections, and reduces the problems and difficulties of final assembly to a minimum. This and the provision of interrelated assembly devices, in the first and second stages, greatly reduces the area requirements, in comparison with earlier plants, and also reduces the cost of transportation.

The new system is applicable to a great variety of technologies, for final assembly of the ship. However, it is of particular utility where the ship's hull is built in section is an assembly and welding hall constructed over the land end of a slip or construction dock, and where the ship's hull, on completion of a section, is outwardly shifted from the hall by the length of the section. With suitably arranged assembly machines in the hall, used a a final assembly area at the head of the slip, the entirety of the assembly processes, in accordance with the new system, is most advantageous.

Of course, the correct arrangement of assembly machines, in existing or newly constructed shipyards or factories, may depend on local areas and conditions. However, it is preferred to arrange the system according to the invention in such a way that transportation from one machine to the other occurs only in progessive directions, that is, towards the place of final assembly. In addition, it is an advantageous feature of the invention that the assembly areas have buffer zones, which they share, for equalization of productive speeds.

DETAILED DESCRIPTION

Hereinafter, the invention will be described in connection with the drawings, wherein FIG. 1 is a schematic plan view of an assembly system incorporating the invention.

Figure 1:
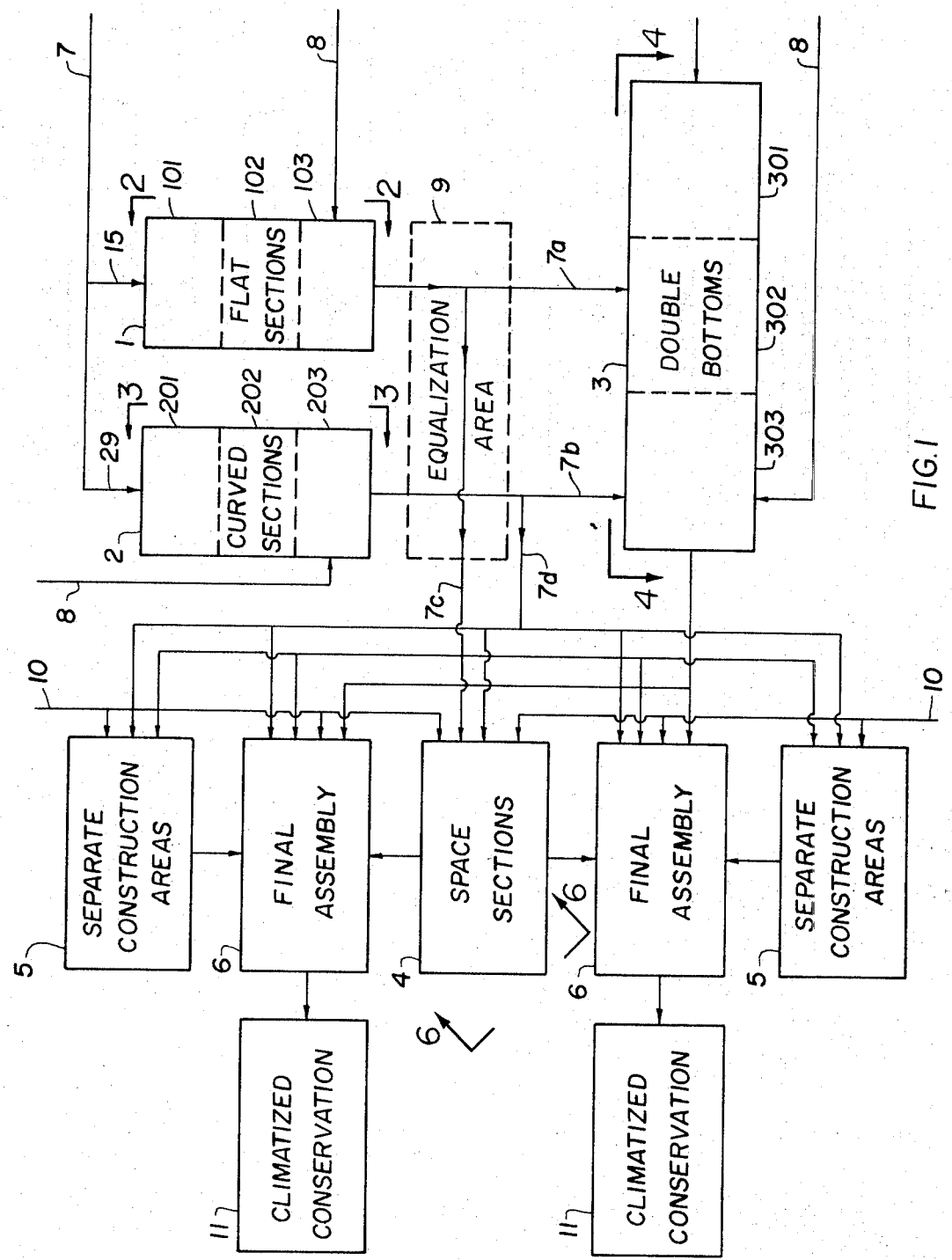

Referring first to FIG. 1: For preparation of flat ship sections, a part of the complete system 1 to 11 is provided in area 1, while another partial system, for preparation of curved sections, is provided in area 2. Both belong to a first assembly area 1, 2, 9. A second assembly area comprises a system for making double bottom, area 3; another serves to make space sections, in area 4: and there are separate construction areas 5. These several areas are interconnected by conveyor systems as indicated, also providing for final assembly in areas 6. Areas 1, 2 and 3 for preparation of flat and curved sections and double bottoms are subdivided into preparation sections 101, 201, 301; work sections 102, 202, 302; and completion sections 103, 203, 303. The preparation sections receive raw material over conveyors 7, and transfer them to work sections, wherefrom they are further transferred, via completion sections, to intermediate conveyors 7a, 7b, 7c, 7d, as shown. Also received are the required equipment units, from conveyors 8. Between areas 1, 2 on the one hand and 3 on the other there is shown equalization area 9 which serves to make sure that the second stage of assembly, comprising areas 3 and 4, receives the intermediate products in proper phase. After final assembly at 6 there may be provided areas 11 for climatized conservation.

Figure 2:
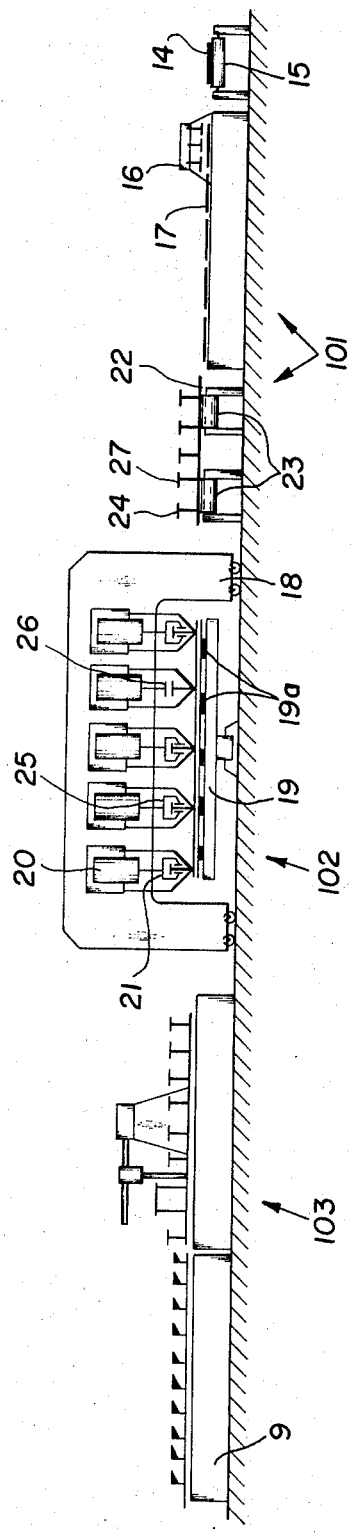
FIG. 2 is an elevational view of part of the complete assembly system, this view being taken along lines 2—2 in FIG. 1.

Referring now to FIG. 2 and the flat section assembly system shown therein: this system receives sheet material 14 over roller conveyor 15, wherefrom layout machine 16 obtains the sheets and lays them out as sheet assembly 17, on suitable, common supports. Movable bridge 18 for the combined purposes of lifting, transporting, pressing and welding the material is transferred to the initial support location of sheet assembly 17, lifts the same by suitable magnetic lifters, not shown, and moves it to work area 102. This area comprises a rotatable table 19, having adjustable weld-backings 19a. For making butt welds in sheet assembly 17, vertically and laterally adjustable carriers 20, supporting welders 21 movable along bridge 18 and carriers 20, are brought into welding position and the welding procedure is then carried out.

Thereafter, combined bridge 18 is shifted to profile system 22, which has been brought into area 101 over rollers 23. A profile piece 24 is taken from system 22 by grippers 25 on carriers 20, this being a profile piece which may be designated as number $(2K-1)$ from a set $(K=1,2....n)$. Combined bridge 18 then returns to area 102. By means of pressing devices 26, secured to the carriers, it presses profile pieces 24 $(2K-1)$ onto sheet unit 17, which pieces it then welds thereto by welders 21. In order to apply further profile pieces 27 ($2K$), the process is repeated.

The flat section completed to this extent is brought to its predetermined destination, for example to completing area 103, work area 302 or equalization area 9 (FIG. 1), by suitable cranes of the assembly hall, not shown, while combination bridge 18 returns to pick up the next sheet unit 17 (FIG. 2).

Thus, it will be seen that the invention provides, in the assembly area for flat sections, a rotatable table 19 with adjustable weld-backings, and a bridge-like carrier and machine system 18, 20 movable over the entire area and provided with devices 21, 26 for lifting and pressing plates and profile pieces, as well as welders 25 of the fillet and butt welding type. According to a further characteristic of the invention, the holders, pressing devices and movable welders are secured to carriers 20 which have means for lifting, lowering and turning them and for adjusting their distance from one another.

Figure 3:
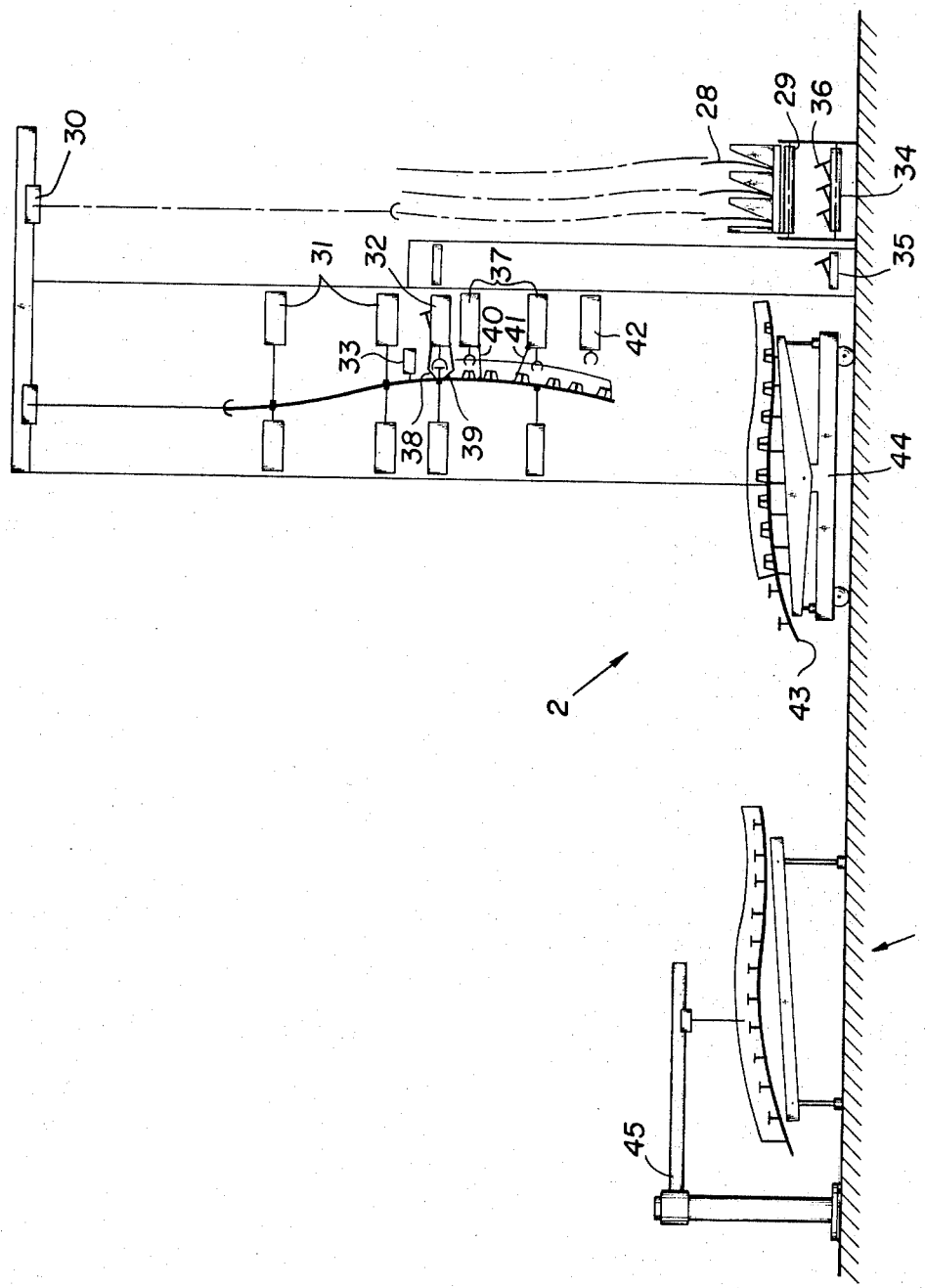
FIG. 3 is a similar view of another part, taken along lines 3—3 in FIG. 1.

The invention also provides an area 2 (FIG. 1) for the assembly of shaped plate sections, wherein steel sheets, hanging in positioning units (FIG. 3), are adjusted and fixed and continuously butt-welded from bottom to top by means of movable welders, the sheets and welds being lowered after each welding procedure and being then reinforced by stiffeners horizontally secured thereto by horizontally movable welders. These and other characteristics may be noted at the right side of FIG. 3, wherein three of the sheets are shown at 28, as they arrive on rollers 29. Lifting and carrying unit 30 moves them into the forming area, where positioning devices 31 bring the sheets into positions defined by a suitable program. The sheets then are assembled by butt-weld machine 33 to form a panel of sheets.

Rollers of a suitable conveyor system 34 cooperate with lifting device 35 to bring profile pieces 36 to profile setting unit 32, near positioning unit 31. Positioning devices 37 orient the profile pieces according to a predetermined program and press them against the sheet panel, whereupon welders 38, 39, 40 attach them to the panel. The procedure is controlled in such a way that the butt-welding operations of welders 33 constantly occur in accord with the rhythm in which stiffeners are applied and attached by welders 38, 39, 40. Small elements, such as welded holders for rollers, are applied by automatic welding unit 41 below the profile attachment means 32.

Figure 4:
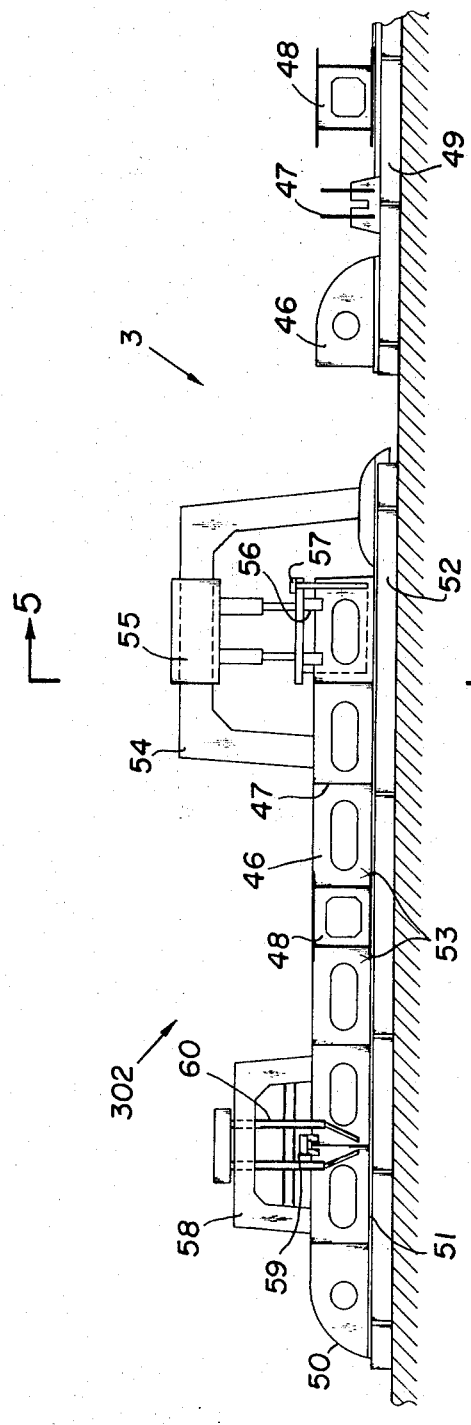
FIG. 4 is a similar view of another part, taken along lines 4—4 in FIG. 1.

Thereafter, receiver unit 42 accepts completed section 43 and places it on carriage 44, which moves it to completion area 203. Here a welder 45 carries out the needed finishing operations. The finished section then is brought to a suitable area (FIG. 1) such as equalization area 9, completion area 303, or space section area 4. This further area, as shown in FIG. 4, receives floor plates 46, longitudinal carriers 47 and pre-assembled pipe duct 48, on a rest surface 49. Also introduced are steel skin 50 and inner bottom 51 from area 1 or 2 or 9.

Construction table 52 initially receives pipe duct 48, on the inside (facing upwardly) of inner bottom 51. These parts are assembled by weld seams 53. Floor plates 46 are then applied, beginning adjacent to the pipe duct, by means of manipulators, provided on combination bridge 54 and including magnetic lifter 55 and gripper 56. These devices bring the aforementioned floor plates from rest surface 59 to able 52, deposit them on inner bottom 51 in accordance with the program, and attach them by fillet welders 57. Similarily, longitudinal carriers 47 are deposited and attached. These procedures are repeated until all floor plates and longitudinal carriers are attached. Combination bridge 54 then makes room for combination bridge 58 which has positioners 59 and vertical welders 60 for vertical welding of the weld crossings.

Figure 5:
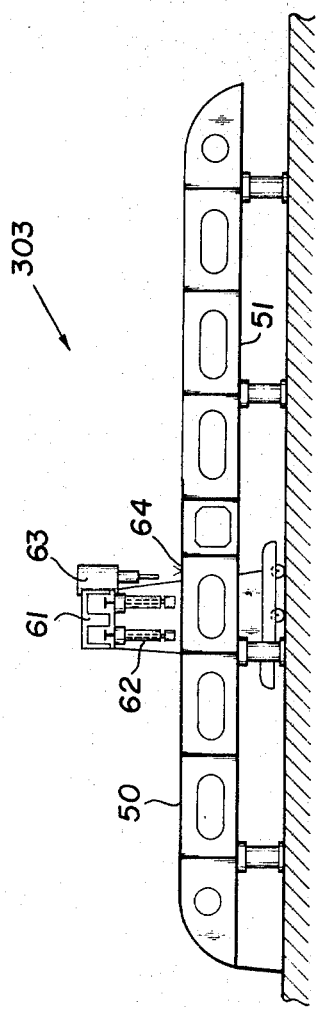
FIG. 5 is a sectional view, taken in a direction generally similar to that along lines 5—5 in FIG. 4.

Thereafter another crane or cycling device, not shown, cycles the double bottom section to completing area 303 (FIG. 5) where the needed equipment (not shown) is brought into the hollow bottom, and outer skin 50 than is attached. This skin is applied by a further bridge 61, having positioners 62 thereon, the skin being suitably prepared as a plate section, and being attached to floor plates 46 and longitudinal carriers 47, by welders 63, making butt-welds 64. It will be noted that bridge 61 has welders and other machines 62, 63 and 64 mounted thereon in individual paths, each of which can be provided with an individual track, supporting a carriage; the carriage, tracks and entire bridge being movable, both horizontally and vertically.

Figure 6:
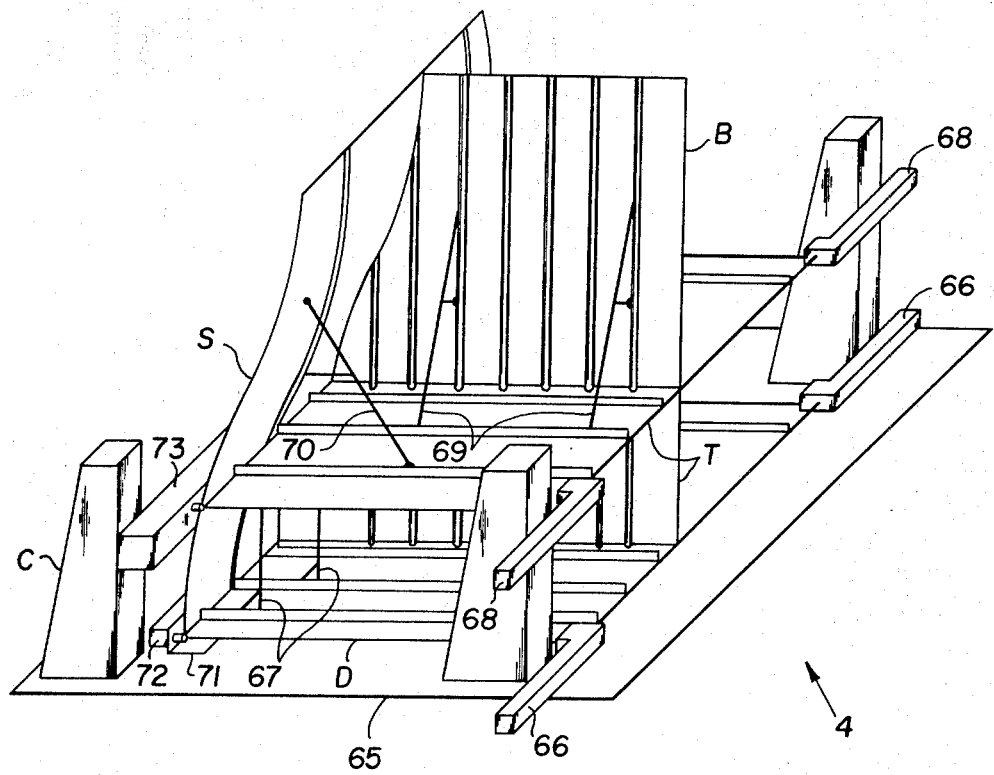
FIG. 6 is a perspective view of another element or subassembly, taken generally along lines 6—6 in FIG. 1.

Referring finally to FIG. 6, three-dimensional sections or space sections, for example container side tanks, are assembled from plate sections and/or T-shaped sections or the like, as follows: A crane, not shown, deposits deck section D, with top surface facing downward, on a totally or partly vertically adjustable mounting surface 65, where the deck is precisely positioned and positively held by arms 66. Pursuant to predetermined attachment of support posts 67, a T-section T is applied. The posts on deck D are in suitable positions to support this section, and the section is laterally held by arms 68. By means of another pairs of arms, not shown, lower bulkhead B, provided with brackets 69, is positioned, held and pressed against the other elements, this lower bulkhead being shown in the upper part of the figure. The various sections are then welded to one another in the position as shown.

Positioning arms (not shown), originally provided on the skin side of the assembly, are then moved from the bulkhead assembly, and an outer skin section S, with upper edge facing downward, is applied, this skin being provided already with brackets 70. It is deposited on a vertically adjustable support 71, is exactly positioned longitudinally of the ship by devices not shown, and is pressed against deck D by projections on stationary press beam 72, and against the intermediate deck (the horizontal part of T-section T) by projections on movable press beam 73, operated by means which include pressure tension control post C, movable under suitable automatic control. The horizontal joints are then welded and the vertical ones spot-welded, whereupon the section can be lifted, turned and transported to the slip for completion of the mounting and welding procedures.

What is claimed is:

1. Construction system for ship's sections comprising a first mechanized assembly area for assembly of flat plate sections from individual elements; a second mechanized assembly area, parallel to the first, for assembly of shaped plate sections from individual elements; machines in each assembly area for the assembly of the corresponding type of plate section, said machines including means for positioning plates in proper orientation, and means for their assembly; a single ship's section assembly area associated with said several mechanized assembly areas and being substantially as long as a ship's section; and means in the latter area for assembling said flat and shaped plate sections into a ship's section as a unit, and for further assembly operations, such as combining it with stiffeners.

2. System according to claim 1 including conveyors reciprocably movable and arranged so that all elements and sections are conveyed toward the ultimate assembly area 3. System according to claim 1 additionally including an equalization area between the areas for making flat plate sections and shaped plate sections, said equalization area preceding the areas following thereafter.

4. System according to claim 1 wherein each area, for flat or shaped plate sections, comprises a plurality of partial areas, one having means for placing incoming plates and elements in readiness for fabrication, another for the fabrication itself, and one fro completion thereof and transfer to another area.

5. Machinery forming part of a system according to claim 1, wherein the area for construction of flat plate sections includes a rotatable table provided with adjustable weld backings, and a bridge unit movable across the entire construction area, said unit having machines for lifting, lowering, pressing and welding the plate material.

6. Machinery as described in claim 5 wherein the bridge unit additionally includes carriers for the machines, and means for adjusting the carriers relative to one another.

7. Machinery as described in claim 5 including a plurality of adjustable lifting devices on he top surface of the table.

8. Machinery as described in claim 5 additionally including means for transporting plates or sections in a position in which they are suspended, said transporting means having positioning devices in at least two planes, one above the other, for fixing the plates in predetermined position for suitable welding operations.

9. Machinery as described in claim 8 additionally including, on the transporting means, welding means for butt welding the plates, said welding means having guide means wherein they are vertically movable, the transporting means additionally having a frame turnable about its longitudinal axis and on said frame, positioning and pressing devices and means for welding stiffeners and the like to the plates.

10. Machinery as described in claim 9, additionally including means on the transporting means, for moving and adjusting the position, pressing and welding devices in or parallel to the plane of the frame.

11. Machinery according to claim 10 additionally including adjustable and tiltable grippers and pressure on the transporting means for attaching vertical ribs to the plate sections.

12. Machinery for fabrication of space sections with reinforcements, in a system according to claim 1, comprising a plurality of bridges movable in one of said areas, one of said bridges having mounted thereon means for butt welding plate units, means for horizontally fillet welding parts thereof, and grippers and pressers for attaching other elements to the section, another bridge having positioners and welders for vertical fillet welding, and a third one having means for pressing additional plates against the section produced by the first and second bridge units.

13. Machinery as described in claim 12 including a bridge having a plurality of horizontal track means, each having a trolley thereon, and grippers, pressers and magnet elements as well as fillet welders on the trolleys.

14. Machinery according to o claim 13 additionally including means to vertically adjust the grippers and pressers relative to the magnets.

15. Machinery according to claim 13 including means for vertically adjusting the grippers, pressers and magnets conjointly.

16. Machinery according to claim 13 including means for tilting outer magnet elements together with grippers and pressers about vertical axes.

17. Machinery according to claim 13 13 including, below a bridge frame, a longitudinal carrier for the welders, and means for moving the carrier parallel as well as obliquely to a midship line.

* * * * *